Jan. 5, 1954          F. S. SMITH          2,664,850
METHOD AND APPARATUS FOR PRODUCING SHOCK WAVES
Filed Nov. 26, 1949
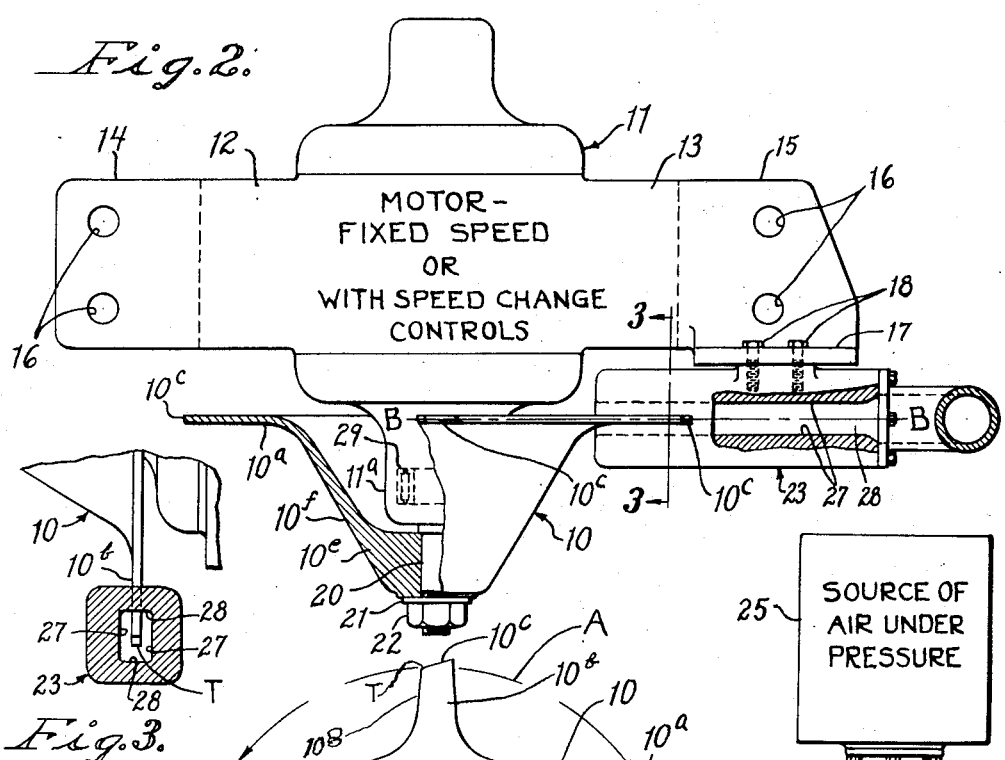
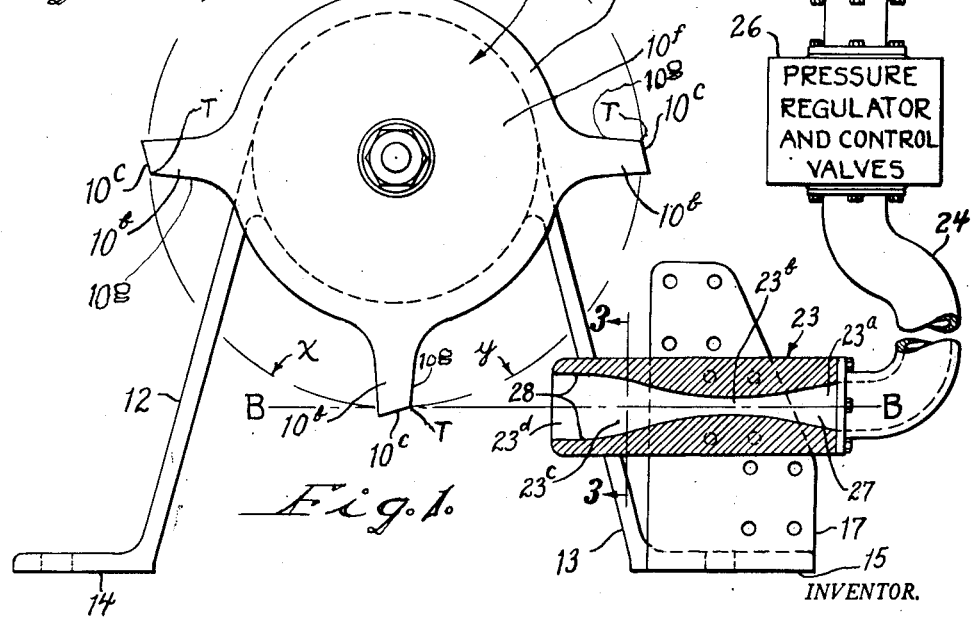
INVENTOR.
Franklin S. Smith Patented Jan. 5, 1954

2,664,850

UNITED STATES PATENT OFFICE 2,664,850

METHOD AND APPARATUS FOR PRODUCING SHOCK WAVES

Franklin S. Smith, Hamden, Conn.

Application November 26, 1949, Serial No. 129,655

14 Claims. (Cl. 116—137)

This invention relates to a method and apparatus for the generation of shock waves in air.

One of the objects of this invention is to provide a practical and economical method and apparatus of the above nature. Another object is to provide an apparatus for generating shock waves that will be relatively inexpensive in construction and operation. Another object is to provide an apparatus and method for generating shock waves in a manner that is relatively low in power input or power consumption and hence is economical to operate. Another object is to provide a method and apparatus of the above-mentioned nature capable of suitable variation or flexibility of control or operation so that a relatively wide range of conditions, such as the generation of weak or of strong shock waves as may be desired, may be achieved according to the particular objective or purpose of application or use of the shock wave.

Another object is to provide a method and apparatus for generating shock waves that will be less costly in first-cost of equipment required as well as less costly in operation. Another object is to facilitate the application of shock waves to various useful purposes, such as the subjection to shock waves of test specimens or shapes or structures, or of test specimens of various materials or compositions of matter, particularly for the study and investigation of the effects thereon of shock waves, or such as the subjection to shock waves of various food products containing insect infestation in its various forms or stages to facilitate the destruction of such insect life and also to facilitate the study and investigation of the effects thereon of shock waves, or such as the subjection to shock waves of vegetable products in kernel form, for example rice, to effect the loosening or removal therefrom of the hull or shell-like structure encasing the kernel, as well as to study and investigate the effects thereon of shock waves.

Another object of this invention is to provide an apparatus, and a method of operating and controlling the same, for the generation of shock waves and which apparatus can be embodied in far more compact, less costly, and more efficient form than such heretofore known apparatus as the so-called wind tunnel, and thereby to facilitate and expedite study, research, and investigation of shock waves and their effects. Another object is to provide a shock-wave-generating apparatus that is relatively low in power consumption and therefore capable of less expensive and relatively economical operation and thereby also stimulate and facilitate study and investigation of shock waves and their actions and effects.

Other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawing, in which is shown by way of illustration, one of the various possible embodiments of the mechanical features of my invention, Fig. 1 is a front elevation of the apparatus with one of the parts shown in central vertical section, certain other parts being diagrammatically indicated;

Fig. 2 is a top view or elevation as seen from above in Fig. 1, certain parts being shown in central horizontal section and certain other parts being broken away in order to indicate certain other parts more clearly, and Fig. 3 is a detached vertical transfer sectional view of one of the parts as seen along the line 3—3 of Figs. 1 and 2.

Similar reference characters refer to similar parts throughout the several views of the drawing.

Referring to Figs. 1 and 2, I provide a rotor 10, illustratively of a construction later described so that it can and will withstand rotation at high peripheral velocity, and for the rotor 10 I provide a suitable source of motive power for driving it at the desired speed, illustratively this may be in the form of an electric motor 11 provided with any suitable frame or standard for supporting it, such as a frame comprising two heavy and strong supporting legs 12—13 secured at their upper ends in any suitable way to the frame of the motor 11 and provided at their lower ends with foot portions 14 and 15 respectively that have bolt holes 16 therein for solidly securing and anchoring the structure to a suitable base or foundation (not shown). An appropriate part of this supporting frame is conveniently and preferably employed to serve as a support or mounting for other apparatus or devices with which the rotor 10 is to coact as is later described, and illustratively the foot portion 15 of the supporting bracket or leg 13 has rigidly secured thereto an upstanding arm or bracket 17 to which such devices or apparatus are secured.

The rotor 10 which, for purposes later mentioned, is preferably in the form of a dished disc has an outer peripheral and generally circular portion 10ª from which projects a suitable number of elements 10ᵇ; the latter are preferably formed as an integral part of the rotor 10 and in the illustrative embodiment they project radially outward from the rotor portion 10ª and they may, as appears from Fig. 2, lie in the same plane as that of the rotor portion 10ª.

The rotor 10 is rotated about its axis at an R. P. M. such that the tips of the radial projections 10ᵇ travel at a velocity that exceeds the local velocity of sound in air. As is known, the velocity of sound at sea level and under normal atmospheric pressure and at 20° C. is 1,120 feet per second, and it varies primarily with change in temperature, that is, in general, increase in temperature of the air increases the velocity of sound, and vice versa.

The rotor 10 may be dimensioned so that the maximum radius thereof, at the effective portions of the radial projections 10ᵇ, is for example 8", in which case the rotor 10 is driven at an R. P. M. of 16,600, giving a velocity of about 1,200 feet per second to the outer effective portions, indicated at 10ᶜ, of the rotor, these portions travelling in a circle indicated in broken lines by the reference character A in Fig. 1.

The electric motor 11 is a convenient and suitable means for so driving the rotor 10 and because of the high speed of rotation of the rotor 10, it is preferably made of a suitably strong material such as a steel forging suitably heat treated and dynamically balanced, and by giving it a dished form like that indicated in Fig. 2, I am enabled to provide it with a suitably heavy and strong hub portion 10ᵉ of relatively small radius by which it is mounted on one end of the shaft 20 adjacent one of the end bearings 21 carried within the frame of the motor; as indicated in Fig. 2, the metal of the rotor 10 merges in decreasing thickness from the hub portion 10ᵉ to form the generally conical or dishlike side walls 10ᶠ which are internally of radii so as to take over, with ample clearance, the portion 11ª of the motor frame that carries the end bearing 29. The conelike portion 10ᶠ in turn merges into the above-described flat peripheral portion 10ª that carries the projections 10ᵇ—10ᶜ and which together lie in preferably the same plane which is preferably at right angles to the axis of the rotor. In this manner I am enabled to achieve not only good strength and rigidity in the structure of the rotor 10 but also such distribution of the metal of the rotor 10 that its center of gravity coincides with the center of the bearing 21 which is one of the bearing supports for the shaft 20.

Any suitable means is employed to secure the rotor 10 to the shaft 20, preferably detachably; for example, the end of the shaft 20 and the bore in the hub 10ᵉ may be given a suitable taper and provided with conventional key-ways and a key (not shown), whence the rotor 10 is locked onto the shaft 20 by a clamping washer 21 and nut 22, the latter being threaded onto a suitably reduced threaded end portion of the shaft 20. Also, the rotor may thus be readily removed, as for replacement by another as lated noted.

As indicated in Fig. 1, the radial projections 10ᵇ, illustratively four in number, are equi-angularly spaced about the axis of the rotor and the effective end portions 10ᶜ thereof, while capable of variation in shape are, in the illustrative embodiment, substantially flat-faced along their leading edges. Thus each may be shaped to provide a flat face 10ᶜ which may make an acute angle to the tangent at the point where one of its radii intersects the circle A, as indicated in Fig. 1. This inclination or angularity of face 10ᶜ is related to the direction of rotation of the rotor and also to the companion leading flat face 10ᵍ of the arm-like radial extension 10ᵇ with which, in the illustrative embodiment, it makes an obtuse angle. The width of these edge faces is, in the illustrative embodiment, the same as the thickness of the parts 10ª and 10ᵇ.

Where these two faces intersect, at an obtuse angle in this embodiment, is formed the effective part of the rotor that is to coact in shock-wave generation, and the resultant apex or part, for convenience in further description, will be referred to by the term "tip." It projects in the general direction of its rotary movement about the rotor axis.

The tip T may be given any desired appropriate conformation or shape. Thus, for example, the angles of, and the angle between, these leading edge faces 10ᶜ and 10ᵍ may be varied and though they are, in this embodiment, described and shown as flat, one or both may be given curvatures as may be desired. Also, where they intersect, they can intersect in a straight or curved line and according to their angularity form a tip with a relatively sharp leading edge at the line of intersection, or as in the illustrative embodiment and as indicated in Fig. 1, the region where they intersect is rounded off at relatively small radius to form a less sharp leading edge; the greater the radius of this curvature, the more blunt would be the tip T.

The direction of rotation of the rotor 10 is counterclockwise as seen in Fig. 1 and as indicated thereon by the arrow, the tips T travelling in a circular path generally indicated by the broken line circle A. Suitably related to the rotor 10 and to the movement of the tips T thereof is a suitable means for effecting flow or movement of air, at a suitable velocity, in a path located so as to be intersected or traversed by the moving tip T, the air moving in a direction opposite to the direction of movement of the tips T themselves. This means may comprise a nozzle-like device generally indicated by the reference character 23; in the drawing, its intake end is at the right and its discharge end at the left. It is constructed to discharge air at suitable velocity and along a suitable path of flow. The device 23 is suitably mounted in appropriate relation to the rotor 10 and is preferably adjustably and also detachably secured in position so as to be readily replaceable. Conveniently, it is secured as by cap screws 18 to the bracket 17 of the supporting frame or standard and is so positioned that its axis B—B, which is also the axis of the emerging stream or jet of air, falls in the plane of rotation of the tips T and is substantially tangential to the circular path of travel A of the tips. Desirably, it is positioned as closely as possible to the rotor 10 so long as suitable clearance exists between the rotating tips T and the physical structure of the device 23 itself.

At its inlet end, the device 23 is supplied with air under pressure in any suitable manner and from any suitable source, such as a tank of compressed air, a blower, compressor, or the like, which is diagrammatically indicated at 25, together with any suitable devices, diagrammatically indicated at 26, for controlling or regulating the pressure, rate of flow, etc., of the air supplied to the device 23 through a suitable conduit or piping 24 provided with a suitable detachable connection to the inlet end of the device 23 so as to facilitate replacement or removal of the latter.

The nozzle-like device 23 may be given various suitable forms and where it is desired to discharge air at supersonic velocity, it is given the form of an "effusor," an illustrative form of which is shown in cross-section in the drawing. In a general sense, an effusor is a DeLaval nozzle for emitting or discharging air at high velocity and to achieve flow of air therefrom at supersonic velocity; it is a nozzle of the "Busemann" type, being two-dimensional. It has two opposed parallel plane side walls 27 (Figs. 2 and 3) and companion and opposed top and bottom walls 28 (Figs. 1 and 3) which are cylindrical in that they are surfaces of revolution about two spaced parallel axes (parallel to the axis B—B of the effusor) of a curved line somewhat as indicated, only for illustrative purposes, in Fig. 1. As indicated in Figs. 1 and 2, the opposed pairs of walls of the flow passage through the effusor 23 are symmetrically located with respect to the axis B—B.

In transverse vertical cross-section, as shown in Fig. 3, the flow passage in the effusor 23 is generally rectangular with its longer axis vertical and falling in the plane of rotation of the tips T. In this manner the emerging jet of air has a substantial vertical dimension, comparable to that of the discharge end of the device 23, and as will later appear, a greater length or arc of the circular path of movement A of the tips T can be made to intersect the jet of air. The dimensions of the flow passage at the discharge end may be, illustratively, on the order of 1" by 2".

As seen in the vertical section shown in Fig. 1, it will be noted that the flow passage through the effusor 23, in a direction from the right to the left, is in general first convergent and then divergent, this shaping being provided by the opposed top and bottom walls 28, while the flow passage in horizontal section and as seen in Fig. 2 is of the same dimension throughout, due to the parallel plane opposed walls 27.

The effusor 23 accelerates the compressed air received from pipe 24 from subsonic speed to supersonic speed. The effusor may be considered as of four parts. The first part 23ª adjacent the inlet end is a converging tube in which the increase in velocity of the air is greater than the corresponding decrease in its density and the air is accelerated to a velocity on the order of the speed of sound at the second part or throat 23ᵇ which is of minimum section. The third part 23ᶜ is a diverging tube in which the increase in velocity of the air is less than the corresponding decrease in density and supersonic speed is attained. The fourth part 23ᵈ renders the emitted jet substantially parallel in flow.

The source of compressed air 25 or the valves or pressure regulator 26 are suited or set or adjusted and volume for which the particular effusor is designed.

The curvatures of the cylindrical walls 28 as shown in Fig. 1 are intended to be only illustrative or indicative, for it is known how to design effusors to achieve any supersonic air flow or jet with parallel flow of steady nature. For the details of such design and construction thereof for purposes of carrying out and practicing my invention reference may be made, for example, to the treatise "Elements of Aerodynamics of Supersonic Flows" by Antonio Ferri, published 1949 by McMillan Company, New York, or the treatise "An Introduction to Aerodynamic Compressibility" by J. Black, published 1947, by Bunhill Publications, Limited, London.

As above noted, the stream of air emitted from the discharge end 23ª of the effusor 23 moves in a direction from the right to the left as seen in Fig. 1 and because of the shaping of the flow passage of the effusor the flow is of relatively steady nature and is parallel to the axis B—B which is therefore substantially the central horizontal axis of the air stream which is more properly termed a "jet" of air. It moves at a velocity that is supersonic where the device 23 is designed and constructed as an effusor; it moves along a path substantially as just described, namely, with the axis B—B coincident substantially with the center line of the jet of air. In general and for a substantial distance from the discharge end of the effusor 23, the cross-sectional area of the jet of air somewhat closely approximates that of the discharge end 23ᵈ of the effusor 23 itself, and this volumetric region in the apparatus, thus generally defined by the general dimensions of the air stream or jet, I term, for convenience, the "path" along which the air moves, in the presently assumed case at supersonic velocity.

With the rotor 10 rotating in counterclockwise direction so that the tips T travel at high velocity in the circular path A, a substantial portion of that circular path of travel A extends into and through the above-described path of high velocity air discharged from the device 23. As indicated in Fig. 1, an arcuate portion from $x$ to $y$ of the circle A may be taken as illustrative or representative of the length of the path of movement of each rotor tip T within the path of movement of the air of the jet, and in a direction opposed thereto. The greater the radius to the tips T, the less is the curvature of that portion $x$ to $y$ and the more nearly rectilinear is the path of travel. Moreover, with substantial radius, a substantial middle portion of the path $x$ to $y$ may be said to be, for practical purposes, closely rectilinear and quite directly opposed in direction to the movement of the air of the jet. It is accordingly throughout this middle region, of substantial length, that most effective straight-line relative movement, for wave generation, takes place between the tip T and the air of the jet. However, substantially similar relative velocities are effective throughout the regions at the ends of the path $x$—$y$, as at the entry end $x$, where the tip T enters the path of the air, and as at the exit end $y$ where the tip T emerges from the air of the jet.

As the part 10b approaches and passes point $x$ on its way to point $y$, the tip T enters the jet of air, piercing the latter from above and centrally of its conformation or path, and then it is progressively more and more depressed into the jet of air, reaching maximum penetration thereof throughout the middle region of the path $x$—$y$. It is throughout this middle region that substantially straight-line relative movement between tip T and the air from device 23 takes place. All of this, of course, takes place at high relative velocity, and so also when the tip T moves from the mid position in the path $x$—$y$ to the point $y$ where it emerges from the path of moving air.

In such manner it is possible to move or project the tip T, at high velocity, into, and opposed to, the high velocity jet of air; the resultant effect is then one due to the relative velocity and that is the sum of the two. But the resultant wave generation is achieved at far less power consumption or input to the apparatus than would be the case were known methods employed.

For example, as heretofore practiced by the use of a high speed air jet at atmospheric pressure directed against a stationary body, the horsepower requirements to produce such an air jet increase nonlinearly or disproportionately with increase in velocity of the air of the jet and by way of illustration these figures might be noted: Approximately 22 horsepower per square inch of cross-section of air jet are required to produce a jet at sonic velocity at atmospheric pressure, but when it is desired to produce such a jet of air at three times sonic velocity (that is, Mach=3), about 560 horsepower per square inch of jet are required.

However, with the method and apparatus of my invention I am enabled, at much less power input, to attain dynamic similarity to a stationary body in a high velocity air jet by setting or adjusting the apparatus to function at any selected rotor tip velocity and any selected air jet velocity. For example, the nozzle device 23 can be constructed or designed to produce a discharge of air or an air jet whose velocity is far less than sonic velocity, for example about one-half sonic velocity, and the speed of the rotor driving motor 11 selected or adjusted to give a rotor tip velocity also less than sonic velocity, for example one half, or this latter effect may be achieved by replacing the rotor 10 with one of such different diameter that at the given speed of the motor 11, which in such case can be a fixed speed motor, will give to the rotor tips T a velocity of about one-half sonic velocity. In this assumed illustration, much less horsepower input to the nozzle device 23 will serve to produce the desired jet velocity and less energy input into the motor 11 is required to give a rotor tip velocity of one-half sonic velocity, all in relation to power input required to produce sonic velocity. Yet the relative velocity achieved in the region or path $x$ to $y$ is the sum of these two velocities, in the illustration totalling sonic velocity, and the total power input is materially less than the horsepower input required for the jet device to discharge air at sonic velocity at atmopsheric pressure.

Thus a condition of Mach=1 can be achieved at less cost, and conditions and results comparable to values greater than Mach=1 can be achieved by other suitable combinations of rotor tip velocity and air jet velocity. For example, with the same nozzle device 23 of the above illustration, the resultant sonic velocity of the illustration and comparable to Mach=1 can be exceeded in any desired stages or steps, as by correspondingly, that is, in stages or steps as desired, increasing the speed of the rotor to give greater than one-half sonic velocity or for a given or fixed speed of the motor, rotors of correspondingly increased diameters can be mounted on the motor shaft to give the desired increase in rotor tip velocity. To illustrate, rotor tip velocity may in this manner be achieved equal to one and one-half times sonic velocity and with the air in the discharge end of the device 23 moving at one-half sonic velocity, the action and effects in the path $x$ to $y$ are thus of a velocity equal to twice sonic velocity and hence equivalent to the conditions of Mach=2.

Or, where the device 23 is an effusor designed and constructed, as above pointed out, to produce an air jet at any selected supersonic velocity, for example, twice supersonic velocity or a condition equivalent to Mach=2, the apparatus is set, adjusted, or the rotor diameter changed, as above indicated, to give a rotor tip velocity of any desired practicable value so that the condition and results corresponding to Mach=2 (the jet velocity) are changed and increased to be thus comparable or equal to the sum of the rotor tip velocity and the jet velocity. Thus a rotor tip velocity equal to sonic velocity (Mach=1) may be achieved but the action at the rotor tips T is that which corresponds to three times sonic velocity, comparable to Mach=3. In like manner, four times sonic velocity may be achieved by providing a rotor tip velocity of twice sonic velocity and while that entails some increased power input to the motor, that represents but a small increment of increase in power consumption compared to the above indicated vastly disproportionate increase in power input to a Busemann type of nozzle with increase in jet velocity. Thus great savings in power input and power consumption are achieved.

Thus it will also be seen that I am enabled to achieve a wide variety of wave intensities, at the tips T as they move along the path $x$ to $y$ in Fig. 1. Weak waves are produced where the sum of the tip velocity and the air stream velocity is small, the intensity and strength increasing as the sum of the velocities approaches and just passes sonic velocity whereupon, as the sum of the velocities increases further into the range of supersonic velocity, the intensity and strength of the produced waves increase still further. The relative motion between the tip T and the moving air in the jet brings about the effect of discontinuity in air flow, causing a shock wave, sometimes also called "compression shock" and "shock front," in which the pressure and density, that is, within the wave, are not only relatively high but also increase intensity with increase in relative velocity. Thus, the higher the relative velocity between the tip T and the moving air, the stronger is the shock wave and the more powerful are its effects.

According to the method and apparatus of my invention, the shock wave, with its apex at or closely adjacent to the tip T, comes into being when the rotor tip T enters the left-hand end, as seen in Fig. 1, of the path $x$ to $y$ and the shock front or shock wave travels with the tip T and at the velocity of the tip T along the path $x—y$; the wave collapses or ceases as soon as the tip T moves out, as at the point $y$, of the path of the moving air emitted by the nozzle device 23. This action is repeated for as many tips T as are provided on the rotor 10, and where the rotor is provided with more than one tip T, these actions at each tip T follow each other in succession, always throughout the path of travel $x—y$, as the tips are successively brought into and out of the air stream emitted by the device 23. The rate at which tips T are thus made successively active may, for a given rotor speed, be varied by correspondingly varying the number of tips, and for this purpose I provide a suitable number of rotors of the same diameter but with different numbers of tips T thereon, any one of which may be selected and mounted upon the drive shaft 20. And for any rotor speed and diameter of rotor, I may in like manner utilize a rotor with the desired number of tips T to give the desired rate of successive action.

In the general region, therefore, to the left of the nozzle device 23, as seen in Figs. 1 and 2, shock waves are thus generated and, for such purposes as earlier noted, selective generation out of a wide range of strength or intensity and of characteristics of the shock wave may be achieved.

This region is relatively of substantial volume and it, or any selected portion or part thereof, and regions adjacent thereto may be utilized for study and investigation or for subjection of subject bodies or articles. For example, specimens of various materials or compositions of materials, or test specimens of various shapes, structures or the like, may by any suitable means be positioned in this region or treatment zone, or moved or passed through the treatment zone for purposes of mechanical testing or determination of characteristics under subjection to shock waves or shock fronts, and in this connection it will also be noted that according to my method and apparatus, any one of a wide range of shock wave characteristics and properties may be selectively produced. Thus also, continued research, study and investigation of shock waves and their effects are facilitated.

It will thus be seen that there have been provided an apparatus and method in which the several objects of my invention are successfully achieved. I am enabled to reduce materially power consumption and hence cost of operation is also lessened materially, and in part also because of relatively low power requirements, first cost of the apparatus is of a materially lower order of magnitude. Moreover, the method and apparatus provide, in a simple, practical and economical manner, a wide range of flexibility or variability of execution or operation, and thus a substantial range of practical requirements, as for the treatment or testing of various subject bodies, articles, devices or the like, may be easily and readily met, while, for purposes of research and investigation, the facility and relatively low cost of achieving the production of shock waves or shock fronts of a wide range of characteristics are of great advantage.

In this latter connection, it might be noted that, as above indicated, the shape or configuration of the tips T may be varied; a sharp leading edge generally results in the production of an attached wave and a blunt leading edge on the tip T, such as a cylindrical surface of relatively substantial radius, results, in general, in producing an unattached wave, these actions being variable in general according to the range of relative velocities employed.

Also, it will be noted that the rotor and its driving means are capable of embodiment in relatively simple and inexpensive form and still provide a wide range of flexibility. The motor 11, while preferably a high speed motor, may be of any suitable type and where change in R. P. M. is desired, it may be of any appropriate design or provided with any suitable means for effecting change in speed of rotation of its shaft. Preferably it is an alternating current motor, such as one of the induction type wherein the rotating armature (usually called a "rotor") lends itself more readily to simpler construction to withstand high rotary speeds. Speed change can be effected by any means including any known means for changing the connections of the stator windings to change the number of poles and thus to change the R. P. M. Where rotors 10 of different diameters are interchangeably provided, this may be done with or without change in speed of the motor 11 and thus flexibility of control and of operation may be extended, or may still be achieved if the motor 11 is a fixed speed motor. Where rotor diameters change, the nozzle device 23 is shifted in location; for example, referring to Fig. 1, if the rotor 10 is replaced by one of lesser diameter, the nozzle device 23 is moved upwardly and also to the left from the position shown in Fig. 1, and this may be readily accomplished by providing in the bracket 17 additional and suitably located sets of holes through which to pass the cap screws 18 for relocating and mounting the device 23 in such other position. For such purpose also, a suitable length or portion of the conduit 24 may be flexible.

Though operable at high values of R. P. M., the illustrative rotor 10 is so shaped and conformed in relation to its weight and to the shaft bearing 29 that, as above described, the center of gravity of the rotor coincides with the center of the bearing 29, thereby lessening tendency to stress the shaft 20 by forces tending to bend it as can be caused by the unsymmetrical load on the rotor as its tips coact with the flowing air emitted by the nozzle device 23.

As many possible embodiments may be made of the mechanical features of the above invention, and as the art herein described might be varied in various parts, all without departing from the scope of the invention, it is to be understood that all matter hereinabove set forth or shown in the accompanying drawings is to be interpreted as illustrative and not in a limiting sense.

I claim:

1. An apparatus for generating shock waves comprising an air-discharge nozzle having an inlet for receiving air and having an outlet for discharging air in a stream of substantial cross-section, a rotor having a projecting part thereon radially spaced from its axis and movable, upon rotation of the rotor, in a circular path, means mounting said nozzle adjacent said rotor and with its axis of air discharge in line with the plane of said circular path and with a substantial arcuate portion of said path intersecting the cross-section of the discharged air stream, means for supplying said nozzle at its inlet end with air under pressure and thereby to coact with said nozzle to effect high velocity of air discharge therefrom, and means for driving said rotor at a speed to give said projecting part thereon relatively high velocity and in a direction to move through said arcuate portion of its circular path in a direction opposed to the direction of movement of air in said stream.

2. An apparatus as claimed in claim 1 having a disconnectable driving connection between said rotor and said driving means therefor, whereby the rotor may be replaced by another in which the radius of its projecting part is different, and means adjustably supporting said air discharge nozzle to relocate it in relation to the differently-diametered replacement rotor.

3. An apparatus as claimed in claim 1 in which said rotor driving means comprises a shaft and bearing means therefor adjacent one end of the shaft, together with means for supporting said rotor on the last-mentioned end of said shaft and near said bearing, said rotor being substantially dished and having its center of gravity substantially coincident with the center of said bearing.

4. An apparatus as claimed in claim 1 in which said rotor has at least one more projecting part thereon, said projecting parts being angularly spaced from one another and all of them moving substantially in said circular path, whereby said projecting parts are successively brought into coaction with said moving air stream.

5. An apparatus as claimed in claim 1 in which said nozzle has structural characteristics comprising surfaces extending from said inlet to said outlet and forming a flow passage therebetween and coacting, upon receiving air at said outlet at the pressure of said supplying means, to discharge air therefrom at less than the local velocity of sound in air.

6. An apparatus as claimed in claim 1 in which said nozzle has a flow passage between said inlet and said outlet bounded by surfaces that include opposed curved surfaces coacting, upon receiving air at said inlet at the pressure of said supplying means, to accelerate the velocity of the air to a value, at the discharge end, at least as great as sonic velocity.

7. An apparatus as claimed in claim 1 in which said rotor driving means has driving connections with said rotor to drive it at an R. P. M. which, in relation to the radius of said circular path, effects movement of said rotor projecting part at a linear velocity equal to or greater than the local velocity of sound in air.

8. An apparatus for applying shock waves to a subject body or bodies, said apparatus comprising a treatment zone having at one end thereof means for flowing a stream of air across the zone and at high velocity, and means for creating discontinuity in the flow of said air stream and comprising a solid part having means mounting it for rotary movement about an axis and in a circular path of movement of which a substantial arcuate portion extends into said air stream and in a general direction lengthwise thereof, and means for driving said mounting means in a direction to move said discontinuity-creating means at substantial velocity and in a direction, along said arcuate portion of said circular path, opposed to the direction of movement of the air in said stream.

9. An apparatus as claimed in claim 8 in which said means for flowing air comprises nozzle means having a flow passage with walls thereof configured to accelerate the velocity of the air moving therein and discharge it therefrom at a velocity equal to or greater than the local velocity of sound in air.

10. An apparatus as claimed in claim 8 in which said driving means drives said mounting means at an R. P. M. which, in relation to the radial distance of said solid part from said axis, effects movement in said circular path at a velocity equal to or greater than sonic velocity.

11. The steps in a method of generating shock waves which comprise flowing air at a velocity $a$ along a path of substantial cross-section and causing a shock-wave-producing discontinuity in said flowing air by moving a body at velocity $b$ along said path and in a direction opposite to that of said flowing air, where the sum of $a$ and $b$ is in the range from just below sonic velocity to and including supersonic velocity.

12. The steps in a method of applying shock waves to a subject body or bodies which comprise generating shock waves in a treatment zone by moving, at high velocity, a solid body within and opposed to a stream of air flowing at high velocity, and thereby generating a shock wave that travels along the path of said solid body, and bringing the subject body or bodies into the path of travel of said travelling shock wave.

13. An apparatus for generating shock waves comprising means for producing and directing an air jet of velocity $a$, a solid body of lesser cross section than the transverse cross section of the air jet, and means for moving said body at a velocity $b$ within the air jet and in directions opposed to the direction of flow of the air jet and substantially at right angles to the said transverse cross section of the air jet, the sum of velocities $a$ and $b$ being in the range from just below sonic velocity to and including supersonic velocity.

14. An apparatus for applying shock waves to a subject body or bodies, said apparatus comprising a treatment zone having means for producing a stream of air flowing at high velocity and for directing the high velocity stream along said treatment zone, a solid body, and means for moving said solid body at high velocity within said high velocity stream and in direction opposite to the direction of flow of said stream of air and substantially at right angles to the transverse cross section of the air stream, the sum of the velocity of the stream of air and the velocity of said solid body exceeding sonic velocity, thereby generating a shock wave that travels along the path of high velocity movement of said solid body.

FRANKLIN S. SMITH.

References Cited in the file of this patent

UNITED STATES PATENTS

| Number | Name | Date |
|---|---|---|
| 668,484 | Bok | Feb. 19, 1901 |
| 852,646 | Blake | May 7, 1907 |
| 951,346 | Stevens | Mar. 8, 1910 |
| 1,786,264 | Reed | Dec. 23, 1930 |
| 2,163,650 | Weaver | June 27, 1939 |
| 2,248,459 | Kieskalt | July 8, 1941 |
| 2,570,081 | Szczeniowski | Oct. 2, 1951 |